(12) United States Patent
Millar

(10) Patent No.: US 7,993,232 B2
(45) Date of Patent: Aug. 9, 2011

(54) ELECTROHYDRAULIC TORQUE TRANSFER DEVICE WITH INTEGRATED CLUTCH AND ACTUATOR UNIT

(75) Inventor: Stuart J. Millar, Maybole (GB)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 12/948,427

(22) Filed: Nov. 17, 2010

(65) Prior Publication Data

US 2011/0065544 A1  Mar. 17, 2011

Related U.S. Application Data

(63) Continuation of application No. 11/948,203, filed on Nov. 30, 2007, now Pat. No. 7,837,587.

(60) Provisional application No. 60/875,185, filed on Dec. 15, 2006.

(51) Int. Cl.
*F16H 37/08* (2006.01)

(52) U.S. Cl. .................................. 475/198; 192/110 B

(58) Field of Classification Search .............. 192/110 B, 192/85 R, 85 CA
See application file for complete search history.

(56) References Cited

U.S. PATENT DOCUMENTS

| 3,800,913 | A  | 4/1974  | Schmitt        |
|-----------|----|---------|----------------|
| 5,358,455 | A  | 10/1994 | Lundstrom      |
| 5,469,950 | A  | 11/1995 | Lundstrom et al. |
| 5,979,631 | A  | 11/1999 | Lundstrom      |
| 7,086,980 | B2 | 8/2006  | Kushino et al. |
| 2004/0159520 | A1 | 8/2004 | Anwar et al.   |

FOREIGN PATENT DOCUMENTS

JP  11-141649 A  5/1999

*Primary Examiner* — Justin Holmes
(74) *Attorney, Agent, or Firm* — Harness, Dickey & Pierce, P.L.C.

(57) ABSTRACT

A power transmission device includes a housing, a rotatable input member and a rotatable output member supported in the housing by a pair of bearings. A friction clutch is operable to selectively transmit a requested magnitude of torque between the input member and the output member. The clutch is axially positioned between the bearings. An actuator is operable to provide an actuation force to the friction clutch to generate the requested magnitude of torque.

17 Claims, 3 Drawing Sheets

ELECTROHYDRAULIC TORQUE TRANSFER DEVICE WITH INTEGRATED CLUTCH AND ACTUATOR UNIT

CROSS-REFERENCE TO RELATED APPLICATIONS

This application is a continuation of U.S. patent application Ser. No. 11/948,203, filed on Nov. 30, 2007, which claims the benefit of U.S. Provisional Application No. 60/875,185, filed on Dec. 15, 2006. The disclosure of the above application is incorporated herein by reference.

BACKGROUND

The present disclosure relates generally to a power transmission device operable to selectively transfer torque between first and second sets of drivable wheels of a vehicle. More particularly, the present disclosure describes a torque transfer device including a clutch integrally associated with driving axle components.

Due to increased demand for four-wheel drive vehicles, many power transmission systems are typically being incorporated into vehicle driveline applications for transferring drive torque to the wheels. Many vehicles include a power transmission device operably installed between the primary and secondary drivelines. Such power transmission devices are typically equipped with a torque transfer mechanism for selectively transferring drive torque from the primary driveline to the secondary driveline to establish a four-wheel drive mode of operation. At least one known torque transfer mechanism includes a dog-type lock-up clutch that may be selectively engaged for rigidly coupling the secondary driveline to the primary driveline when the vehicle is operated in four-wheel drive mode. Drive torque is delivered only to the primary driveline when the lock-up clutch is released and the vehicle operates in a two-wheel drive mode.

Another type of power transmission device is operable for automatically directing drive torque to the secondary wheels without any input or action on the part of a vehicle operator. When traction is lost at the primary wheels, the four-wheel drive mode is entered. Some transfer cases are equipped with an electrically-controlled clutch actuator operable to regulate the amount of drive torque transferred to a secondary output shaft as a function of changes in vehicle operating characteristics such as vehicle speed, throttle position and steering angle. Typically, the power transfer device includes a clutch positioned within the transfer case housing.

While many power transfer devices are currently used in four-wheel drive vehicles, a need exists to advance the technology and recognize the system limitations. For example, the size, weight and packaging requirements of the power transmission device may make such system costs prohibitive in some four-wheel drive applications.

SUMMARY

A power transmission device includes a housing, a rotatable input member and a rotatable output member supported in the housing by a pair of bearings. A friction clutch is operable to selectively transmit a requested magnitude of torque between the input member and the output member. The clutch is axially positioned between the bearings. An actuator is operable to provide an actuation force to the friction clutch to generate the requested magnitude of torque.

An axle assembly can include a housing and a differential in the housing. The differential can have a ring gear. The axle assembly can also include an input pinion that includes a pinion shaft and a pinion gear that is meshingly engaged to the ring gear. The axle assembly can also include a friction clutch having an input member, an output member and a clutch pack, the input member being supported for rotation in the housing, the output member being coupled to the pinion shaft for common rotation, and the clutch pack being configured to rotatably couple the output member to the input member for rotation therewith. The axle assembly can also include a head bearing mounted directly on the pinion shaft proximate the pinion gear so as to be positioned axially between the pinion gear and the clutch pack. The head bearing can further be mounted to the housing to support the pinion shaft for rotation in the housing. The axle assembly can further include a tail bearing directly mounted on the pinion shaft on a side of the clutch pack that is opposite the head bearing. The tail bearing can further be mounted to the input member.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses.

The present disclosure is directed to a power transmission device that may be adaptively controlled for modulating the torque transferred between a rotatable input member and a rotatable output member. The torque transfer mechanism may be useful within motor vehicle drivelines as a stand alone device that may be easily incorporated between sections of propeller shafts, directly coupled to a driving axle assembly, or other in-line torque coupling applications. Accordingly, while the power transmission device is hereinafter described in association with a specific structural embodiment for use in a driveline application, it should be understood that the arrangement shown and described is merely exemplary.

Figure 1:
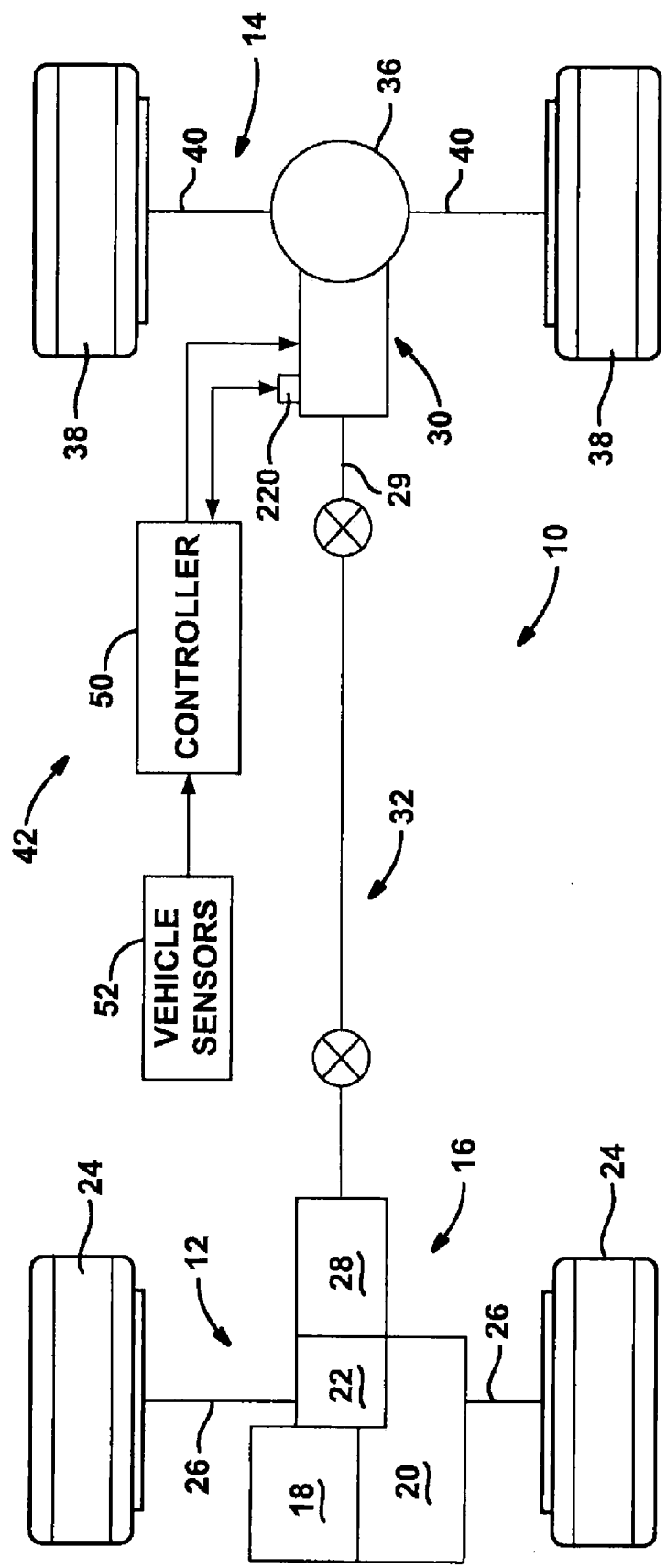
FIG. 1 is a schematic of an exemplary vehicle equipped with a torque transfer mechanism constructed in accordance with the teachings of the present disclosure.

With reference to FIG. 1 of the drawings, a drive train 10 for a four-wheel vehicle is shown. Drive train 10 includes a first axle assembly 12, a second axle assembly 14 and a power transmission 16 for delivering drive torque to the axle assemblies. In the particular arrangement shown, first axle 12 is the front driveline while second axle 14 is the rear driveline. Power transmission 16 includes an engine 18 and a multi-speed transmission 20 having an integrated front differential unit 22 for driving front wheels 24 via axle shafts 26. A transfer unit 28 is also driven by transmission 20 for delivering torque to an input member 29 of a coupling 30 via a driveshaft 32. The input member 29 of the coupling 30 is coupled to driveshaft 32 while its output member is coupled to a drive component of a rear differential 36. Second axle assembly 14 also includes a pair of rear wheels 38 connected to rear differential 36 via rear axle shafts 40.

Drive train 10 is shown to include an electronically-controlled power transfer system 42 including coupling 30. Power transfer system 42 is operable to selectively provide drive torque in a two-wheel drive mode or a four-wheel drive mode. In the two-wheel drive mode, torque is not transferred via coupling 30. Accordingly, 100% of the drive torque delivered by transmission 20 is provided to front wheels 24. In the four-wheel drive mode, power is transferred through coupling 30 to supply torque to rear wheels 38. The power transfer system 42 further includes a controller 50 in communication with vehicle sensors 52 for detecting dynamic and operational characteristics of the motor vehicle. The controller is operable to control actuation of coupling 30 in response to signals from vehicle sensors 52. The controller 50 may be programmed with a predetermined target torque split between the first and second sets of wheels. Alternatively, controller 50 may function to determine the desired torque to be transferred through coupling 30 via other methods. Regardless of the method used for determining the magnitude of torque to transfer, controller 50 operates coupling 30 to maintain the desired torque magnitude.

Figure 2:
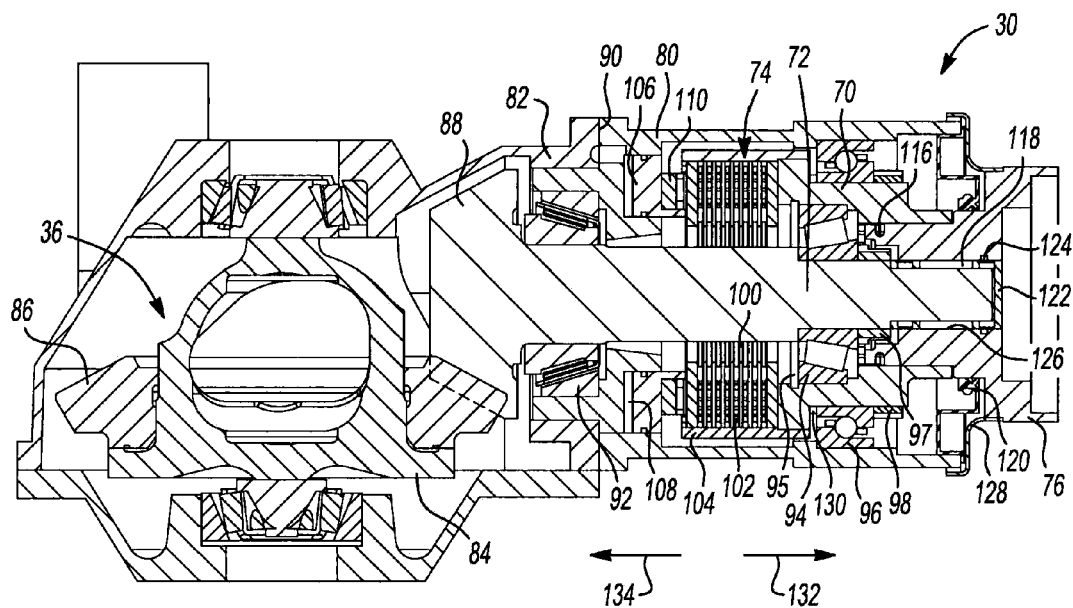
FIG. 2 is a cross-sectional view of the torque transfer mechanism.
Figure 3:
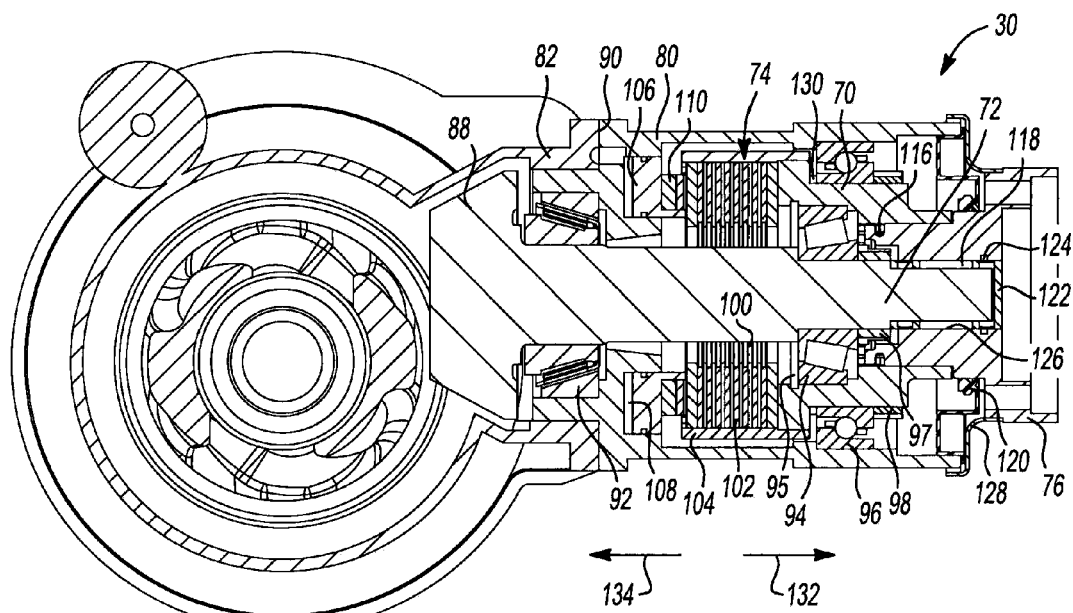
FIG. 3 is another cross-sectional view of the torque transfer mechanism.
Figure 4:
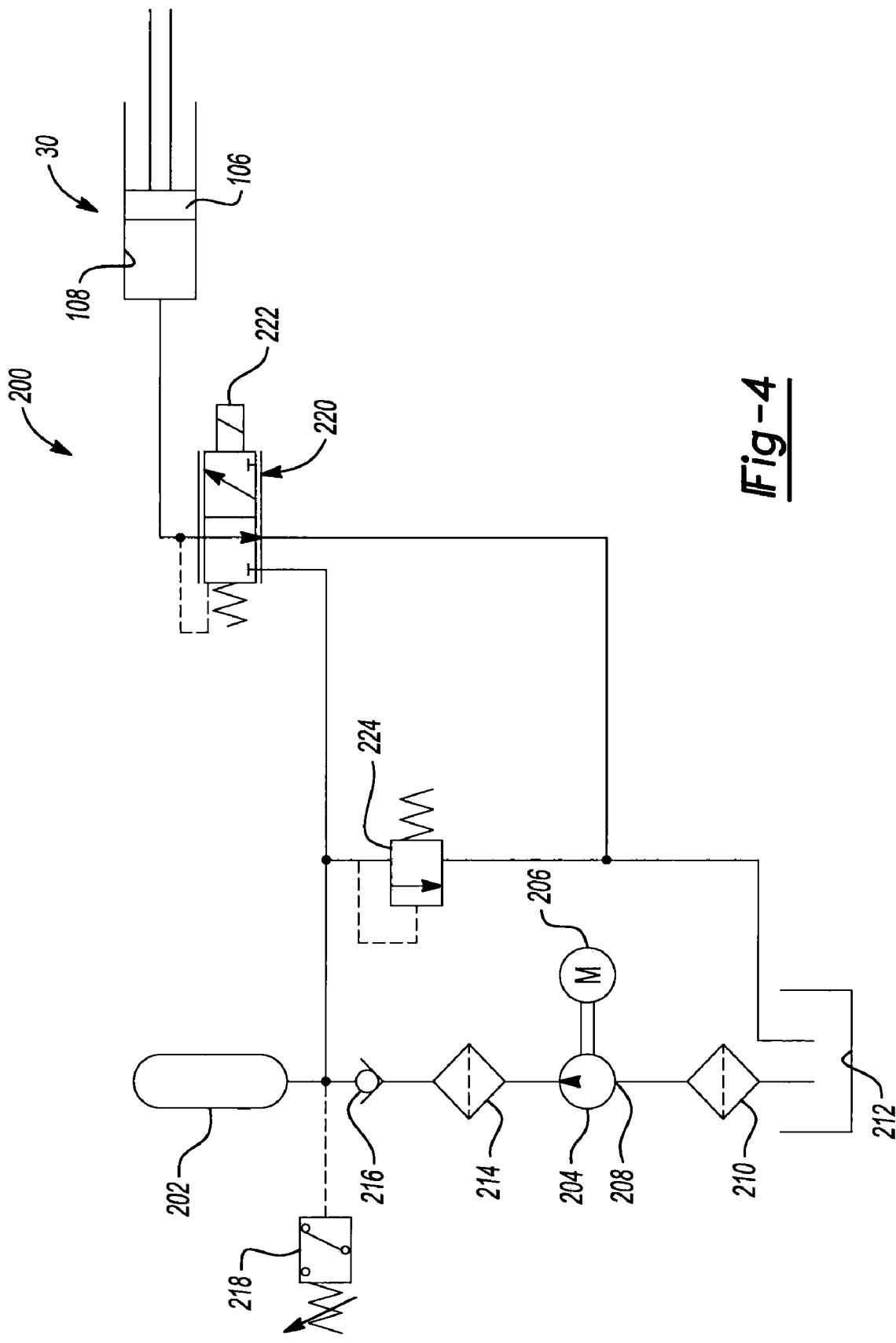
FIG. 4 is a schematic depicting a hydraulic circuit in cooperation with the torque transfer mechanism.

FIGS. 2-4 depict coupling 30 in greater detail. Coupling 30 includes an input shaft 70 selectively drivingly coupled to an output shaft or pinion 72 via a friction clutch 74. An input flange 76 is mounted on one end of input shaft 70 to provide a mounting provision for a driveline component such as driveshaft 32.

Coupling 30 includes a housing 80 fixed to a rear axle housing 82. Rear axle housing 82 rotatably supports a differential case 84 of rear differential 36. A ring gear 86 is fixed to differential case 84. Pinion 72 includes a pinion gear 88 integrally formed thereon and positioned in meshed engagement with ring gear 86. To achieve the appropriate gear mesh, a height setting shim 90 is positioned between housing 80 and rear axle housing 82.

Pinion 72 is rotatably supported by a pinion head bearing 92 and an inner tail bearing 94. Pinion head bearing 92 is pressed into housing 80. A clip 95 retains inner tail bearing 94 within a pocket formed within input shaft 70. A nut 97 retains inner tail bearing 94 on pinion 72. Input shaft 70 is rotatably supported within housing 80 by an outer tail bearing 96. A nut 98 retains outer tail bearing 96 on input shaft 70. Axial movement of pinion 72 and input shaft 70 is restricted by this arrangement.

As previously mentioned, friction clutch 74 may be selectively actuated to drivingly interconnect input shaft 70 and pinion 72. Friction clutch 74 includes a plurality of inner clutch plates 100 fixed for rotation with pinion 72 via involute splines. A plurality of outer clutch plates 102 are fixed for rotation with a drum 104 via another set of involute splines. Drum 104 is fixed to input shaft 70. A laser welding technique may be employed to accomplish this task. Alternatively, the two-piece assembly of input shaft 70 and drum 104 may be replaced by a one-piece shaft having splines generated by a shaping operation.

A piston 106 is slidably positioned within a piston cavity 108 formed in housing 80. Piston 106 may be acted on by a pressurized fluid to selectively apply a clutch actuation force to inner clutch plates 100 and outer clutch plates 102 to transfer torque through friction clutch 74. A thrust bearing 110 is positioned between piston 106 and friction clutch 74 to allow relative rotation therebetween.

Input flange 76 is coupled for rotation with input shaft 70 via an involute spline. A snap ring 116 axially retains input flange 76 on input shaft 70. A bushing 118 rotatably supports input flange 76 on pinion 72 allowing relative rotation therebetween. A seal 120 is positioned to prevent egress of oil and ingress of contamination between input flange 76 and housing 80. A cap 122 and o-ring 124 seal a bore 126 extending through input flange 76. A flinger 128 is coupled to input flange 76 to encourage debris away from seal 120. Bearing preload is achieved by measuring the components and selecting an appropriately sized spacer 130 against which outer tail bearing 96 is tightened. During normal driving conditions, outer tail bearing 96 rotates and inner tail bearing 94 is static. Inner tail bearing 94 rotates only when there is a differential speed between front wheels 24 and rear wheels 38.

Furthermore it should be appreciated that friction clutch 74 is axially positioned between pinion head bearing 92 and inner tail bearing 94. This configuration provides a number of design benefits. In particular, a minimized packaging envelope is required due to the length of the rear axle assembly and coupling combination being greatly reduced compared to competitive designs. Competitive couplings are typically not integrated into the rear axle but instead may be bolted to an axle housing that rotatably supports the pinion. The known axle housings have a predetermined length in order to maintain an adequate spacing between the pinion head bearing and the pinion tail bearing to support the pinion adequately. The present disclosure utilizes the space between pinion head bearing 92 and inner tail bearing 94 by positioning friction clutch 74 at this location. This packaging feat allows a vehicle manufacturer to utilize the vehicle under body space for other challenges such as maximizing fuel tank volume.

Positioning friction clutch 74 between pinion head bearing 92 and inner tail bearing 94 encourages maintaining at least a minimum distance between pinion head bearing 92 and inner tail bearing 94. It should be appreciated that an increase in gear life, an increase in bearing life, and a decrease in noise generated by the bearings and gear mesh may result from increasing the spacing between the pinion bearings.

Coupling 30 also provides a unique bearing loading arrangement. In a standard rear axle equipped with hypoid gearing, a thrust load encountered by the hypoid pinion reciprocates between drive and over-run modes of operation. In the drive mode, the thrust of the gear forces acts in a first direction 132 toward input flange 76. In an over-run or coast mode, the thrust is in an opposite direction 134. Oftentimes, steep angle tapered roller bearings are required at the pinion head and pinion tail positions to react the reciprocating loads. The pinion head bearing reacts gear thrust loads in the drive mode while the pinion tail bearing reacts the thrust loads in the over-run mode of operation. Furthermore, a relatively high pre-load is required between the pinion head and pinion tail bearings to reduce the likelihood of noise caused by the reciprocating load. A high bearing preload increases drag and therefore reduces the mechanical efficiency of the power transmission device.

The torque transfer device of the present disclosure provides a solution to issues arising from the reciprocating loads. When coupling 30 transfers torque, a thrust load is generated on input shaft 70 in first direction 132 toward input flange 76. The load is transferred through inner tail bearing 94 and nut 97 into pinion 72. In the drive mode of operation, a gear thrust load is generated in pinion 72 also acting in first direction 132. Accordingly, a net thrust load is in the same direction 132. This thrust load is reacted through pinion head bearing 92 into housing 80.

In the over-run mode of operation, the thrust load generated by friction clutch 74 continues to act in first direction 132 and is transferred to pinion 72 as previously described. However, thrust loads input through pinion 72 are now in the opposite direction 134. The pinion gear thrust loads generated during the over-run mode are of a lesser magnitude than the clutch thrust loads. Therefore, the net thrust load on pinion 72 is in first direction 132 and is reacted into housing 80 through pinion head bearing 92 as previously described. It should be appreciated that the net pinion thrust loads experienced by pinion 72 consistently act in first direction 132. This predictable loading allows for a reduced preload in the bearing arrangement which also reduces drag and therefore increases mechanical efficiency. Because the thrust loading is uni-directional, higher efficiency bearings may be used at the constantly rotating outer tail bearing 96 position.

FIG. 4 presents a schematic of a hydraulic circuit 200 in communication with coupling 30. Hydraulic circuit 200 includes an accumulator 202 for storing pressurized hydraulic fluid provided by a hydraulic pump 204 driven by an electric motor 206. An inlet 208 of pump 204 is in communication with a low pressure filter 210. Fluid may be drawn from a sump 212 through low pressure filter 210 and pump 204. Highly pressurized fluid exits pump 204 and passes through a high pressure filter 214. Pressurized fluid continues to flow through a check valve 216 to charge accumulator 202. Check valve 216 restricts fluid from flowing in a reverse direction toward pump 204.

A pressure switch 218 controls motor 206 and pump 204 to maintain a desired fluid pressure within accumulator 202. If the pressure within accumulator 202 drops below a predetermined value, pressure switch 218 closes to cause motor 206 to drive pump 204 and provide pressurized fluid to accumulator 202. A proportional pressure reducing valve 220 is in communication with the pressurized fluid within accumulator 202. Proportional pressure reducing valve 220 includes a solenoid 222 that may be selectively actuated to allow pressurized fluid to act on piston 106. In one arrangement, controller 50 provides a pulse width modulated signal to solenoid 222 to accurately control the pressure applied to piston 106. As pressure is applied to piston 106, a compressive force acts on friction clutch 74. The output torque of friction clutch 74 is controlled by varying the pressure applied to piston 106 via proportional pressure reducing valve 220. When solenoid 222 is not actuated, fluid within piston cavity 108 returns to sump 212 and torque is not transferred through friction clutch 74. A pressure relief valve 224 is positioned between accumulator 202 and proportional pressure reducing valve 220 to relieve pressure within accumulator 202 if a predetermined value is exceeded.

Coupling 30 also incorporates a lubrication and actuation system using a single lubricant from sump 212 to lubricate the rear axle, lubricate and cool friction clutch 74 and also act as the actuation fluid stored in accumulator 202 acting on piston 106. A GL5 synthetic oil with friction modifier additives or an automatic transmission fluid may exhibit desirable properties for this application. Because a common hydraulic fluid is being used throughout the system, friction clutch 74 may include carbon fiber friction linings. By using a single lubricant, the risk of cross-contamination of lubricants is eliminated.

Motor 206 and pump 204 may also be used to provide a low pressure output of lubrication spraying onto pinion gear 88 and ring gear 86. A fluid level within sump 212 may be maintained below a lower extremity of ring gear 86. Mechanical efficiency of rear axle 14 may be increased due to a reduction in churning losses. Alternatively, ring gear 86 may extend into the fluid contained within sump 212 by a reduced amount compared to a standard rear axle assembly to reduce energy loss.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An axle assembly comprising:
 a housing;
 a differential in the housing, the differential having a ring gear;
 an input pinion having a pinion shaft and a pinion gear that is meshingly engaged to the ring gear;
 a friction clutch having an input member, an output member and a clutch pack, the input member being supported for rotation in the housing, the output member being coupled to the pinion shaft for common rotation, the clutch pack being configured to rotatably couple the output member to the input member for rotation therewith;
 a head bearing mounted directly on the pinion shaft proximate the pinion gear so as to be positioned axially between the pinion gear and the clutch pack, the head bearing further being mounted to the housing to support the pinion shaft for rotation in the housing; and
 a tail bearing directly mounted on the pinion shaft on a side of the clutch pack that is opposite the head bearing, the tail bearing further being mounted to the input member;
 wherein the head and tail bearings are preloaded in an axial direction.

2. The axle assembly of claim 1, wherein the friction clutch further comprises an actuator that is configured to selectively apply an actuation force to selectively engage the clutch pack.

3. The axle assembly of claim 2, wherein the actuator is hydraulically operated.

4. The axle assembly of claim 3, wherein the actuator includes a piston and a thrust bearing, the thrust bearing being disposed between a plurality of interleaved clutch plates and the piston.

5. The axle assembly of claim 4, wherein the piston has an annular shape.

6. The axle assembly of claim 3, wherein the actuator further comprises a hydraulic circuit having a pump and an electric motor that is operable for driving the pump.

7. The axle assembly of claim 6, wherein the hydraulic circuit further comprises an accumulator coupled in fluid communication to an outlet of the pump.

8. The axle assembly of claim 6, wherein the hydraulic circuit further comprises a reducing valve having a solenoid that is coupled to a controller, the controller being configured to control the solenoid via pulse width modulation to vary the actuation force in a desired manner.

9. The axle assembly of claim 8, further comprising a pressure switch for sensing a pressure of a hydraulic fluid for operating the friction clutch and generating a sensor signal in response thereto.

10. The axle assembly of claim 9, wherein the sensor signal toggles between a first value and a second value, the first value corresponding with the pressure being greater than or equal to a predetermined pressure threshold, the second value corresponding with the pressure being less than the predetermined pressure threshold.

11. The axle assembly of claim 8, wherein the controller controls a duty cycle of the solenoid based on a predetermined relationship between pressure and duty cycle, and wherein the controller does not employ feedback to control the actuating force.

12. The axle assembly of claim 6, wherein the hydraulic circuit further comprises a filter.

13. The axle assembly of claim 12, wherein the filter is disposed in fluid communication between an outlet of a pump and the actuator.

14. The axle assembly of claim 3, wherein hydraulic fluid employed for actuation of the friction clutch is also employed for lubrication of the head bearing and the tail bearing.

15. The axle assembly of claim 11, wherein the hydraulic fluid is also employed to lubricate the pinion gear and the ring gear.

16. The axle assembly of claim 1, wherein a thrust bearing is disposed between the housing and the input member of the friction clutch.

17. The axle assembly of claim 1, wherein a net axial load acting on the output member when the friction clutch is transmitting rotary power from the input pinion to the output member is directed through the pinion shaft axially away from the pinion gear, and wherein a net axial load acting on the output member when the output member overruns the input pinion is directed through the pinion shaft axially away from the pinion gear.

* * * * *